(12) United States Patent
Yoon et al.

(10) Patent No.: US 7,869,150 B2
(45) Date of Patent: Jan. 11, 2011

(54) ACTUATOR, METHOD OF CONTROLLING THE SAME, AND CAMERA MODULE INCLUDING THE ACTUATOR

(75) Inventors: Young Bok Yoon, Gyunggi-do (KR); Hyun Phill Ko, Gyunggi-do (KR); Seong Ho Kang, Gyunggi-do (KR); Jae Ho Baik, Busan (KR)

(73) Assignee: Samsung Electro-Mechancis Co., Ltd., Suwon (KR)

( * ) Notice: Subject to any disclaimer, the term of this patent is extended or adjusted under 35 U.S.C. 154(b) by 0 days.

(21) Appl. No.: 12/485,531

(22) Filed: Jun. 16, 2009

(65) Prior Publication Data

US 2010/0128371 A1   May 27, 2010

(30) Foreign Application Priority Data

Nov. 27, 2008   (KR) ...................... 10-2008-0119100

(51) Int. Cl.
*G02B 7/02* (2006.01)
*G03B 17/00* (2006.01)

(52) U.S. Cl. ........................................ 359/824; 396/55

(58) Field of Classification Search ......... 359/694–701, 359/811–824; 396/696, 697, 53, 55
See application file for complete search history.

(56) References Cited

U.S. PATENT DOCUMENTS

| | | | | | |
|---|---|---|---|---|---|
| 5,825,560 | A | * | 10/1998 | Ogura et al. ................. | 359/822 |
| 5,932,984 | A | * | 8/1999 | Murakami et al. .......... | 318/560 |
| 5,969,886 | A | * | 10/1999 | Sato et al. ................... | 359/813 |
| 6,188,530 | B1 | * | 2/2001 | Katsuragi ................... | 359/824 |
| 7,426,081 | B2 | * | 9/2008 | Paik et al. ................... | 359/694 |

FOREIGN PATENT DOCUMENTS

| | | |
|---|---|---|
| KR | 10-2007-0084961 | 8/2007 |
| KR | 10-2008-0039239 | 5/2008 |
| KR | 10-2008-0068369 | 7/2008 |

* cited by examiner

*Primary Examiner*—Mohammed Hasan (57) ABSTRACT

An actuator used for a camera module and controlling a lens assembly to move along an optical axis, includes a magnet disposed on a side of the lens assembly, a coil part disposed within a magnetic field of the magnet and controlling an up-and-down movement of the lens assembly when an electric power is applied, and a yoke part disposed to horizontally move the magnet disposed on the side of the lens assembly. The lens assembly is provided with a friction-generating member generating a frictional force to the lens assembly in an opposite direction to a direction in which the lens assembly moves to the yoke part.

17 Claims, 7 Drawing Sheets

ACTUATOR, METHOD OF CONTROLLING THE SAME, AND CAMERA MODULE INCLUDING THE ACTUATOR

CROSS-REFERENCE TO RELATED APPLICATIONS

This application claims the priority of Korean Patent Application No. 2008-119100 filed on Nov. 27, 2008 in the Korean Intellectual Property Office, the disclosure of which is incorporated herein by reference.

BACKGROUND OF THE INVENTION

1. Field of the Invention

The present invention relates to an actuator, a method of controlling the actuator, and a camera module including the actuator, and more particularly, to an actuator, a method of controlling the actuator, and a camera module including the actuator that are adapted for moving a lens assembly along an optical axis using a voice-coil-actuator-type driving part configured to apply an electric current to a coil within the magnetic field of a magnet, and adapted for using a frictional force to prevent the lens assembly from returning to its initial position when the applying of the electric current is stopped.

2. Description of the Related Art

In general, as methods of manufacturing a mobile communication terminal including a digital camera or a camera module are developed, camera modules are miniaturized and lightened.

Recently, as the number of pixels in camera module packages for a mobile communication terminal is increased and functions of the camera module packages are improved, the camera module packages are dramatically developed so as to obtain the performance of high quality digital cameras. Particularly, various studies are carried out for realizing an auto focusing technology in the size of the camera module package for a mobile communication terminal.

Actuators, configured to realize the auto focusing technology, are classified into a voice coil actuator (VCA) using a Lorentz force and a piezo actuator using a piezoelectric effect.

The voice coil actuator includes a support part and a driving magnet part. The support part, supporting a lens assembly, includes a spring member that returns the lens assembly to its initial position when an electric current is not applied. The driving magnet part generates the Lorentz force by applying the electric current to a coil disposed within a magnetic field generated by a magnet, so as to move the lens assembly along an optical axis.

The voice coil actuator moves the lens assembly along the optical axis using the Lorentz force generated by applying the electric current to the coil disposed within the magnetic field generated by the magnet, and the spring member returns the lens assembly to its initial position when the applying of the electric current is stopped.

The piezo actuator moves a lens assembly by repeatedly applying pulse signals to a piezoelectric element, and returns the lens assembly to its initial position using a ball bearing or a sliding bearing replacing a support member such as a spring.

The instability of a spring in the voice coil actuator causes malfunctions including tilting and decentering according to part variations or assembly variations, and an electric power must be continuously supplied to keep the lens assembly at a position displaced in a predetermined extent from force equilibrium.

Also, when the lens assembly returns to its initial position, great stress is exerted on the spring, thereby decreasing reliability.

The lens assembly of the piezo actuator moves more stably than that of the voice coil actuator, but material costs of the piezo actuator is higher than those of the coil or the magnet, and requires an additional position sensor because of the uncertainty of friction.

Thus, an actuator for a camera module is required for addressing the limitations of the voice coil actuator and the piezo actuator and taking the advantages thereof.

SUMMARY OF THE INVENTION

An aspect of the present invention provides an actuator and a camera module including the actuator, which are adapted for moving a lens assembly along an optical axis by applying an electric current to a coil within the magnetic field of a magnet, and adapted for using a frictional force to prevent the lens assembly from returning to its initial position when the applying of the electric current is stopped.

Another aspect of the present invention provides a method of controlling an actuator for a camera module, which is adapted for moving a lens assembly upward along an optical axis by applying a forward electric current to a coil within the magnetic field of a magnet, and adapted for using a frictional force to stop the lens assembly when the applying of the electric current is stopped, and adapted for moving the lens assembly downward along the optical axis by applying a reverse electric current to the coil within the magnetic field of the magnet.

According to an aspect of the present invention, there is provided an actuator used for a camera module and controlling a lens assembly to move along an optical axis, the actuator including: a magnet disposed on a side of the lens assembly; a coil part disposed within a magnetic field of the magnet and controlling an up-and-down movement of the lens assembly when an electric power is applied; and a yoke part disposed to horizontally move the magnet disposed on the side of the lens assembly, wherein the lens assembly is provided with a friction-generating member generating a frictional force to the lens assembly in an opposite direction to a direction in which the lens assembly moves to the yoke part.

The frictional force may stop the lens assembly when the applying of the electric power to the coil part is stopped.

The yoke part may constitute a surface of a housing of the camera module and the surface may face the magnet, and the coil part may be attached to an inner surface of the yoke part, and the inner surface may be disposed toward an inside of the housing.

The lens assembly may include a friction-generating-member receiver part therein, and the friction-generating-member receiver part may receive the friction-generating member, and the friction-generating member may have a shaft shape and be in contact with a surface of the friction-generating-member receiver part to provide the frictional force.

The yoke part disposed to move the magnet horizontally may constitute the friction-generating member, and the yoke part may be in contact with a surface of a friction-generating-member receiver part disposed in the lens assembly to provide the frictional force.

The yoke part may be bent in an opposite direction to a direction in which the magnet moves.

The yoke part may be provided to a housing of the camera module, and the housing may face the magnet, and the friction-generating member may be a rod extending from a side portion of the housing of the camera module and be in contact with a surface of a friction-generating-member receiver part disposed in the lens assembly to provide the frictional force.

The friction-generating member may be bent in an opposite direction to a direction in which the magnet moves.

According to another aspect of the present invention, there is provided a method of controlling an actuator for a camera module, the method including: applying a forward electric power to a coil part disposed within a magnetic field of a magnet provided to a side of a lens assembly, to move the lens assembly upward along an optical axis; stopping the applying of the forward electric power to the coil part when the lens assembly arrives at a target position; stopping the lens assembly using a frictional force of a friction-generating member supported against the lens assembly, the frictional force being generated by a force horizontally moving the magnet to a yoke part; and applying a reverse electric power to the coil part to move the lens assembly downward along the optical axis.

The frictional force may be generated in an opposite direction to a direction in which the lens assembly moves to the yoke part.

When the lens assembly arrives at the target position, a hall sensor may sense the target position of the lens assembly to transmit a signal stopping the applying of the electric power.

According to another aspect of the present invention, there is provided a camera module including: a lens assembly movable upward and downward along an optical axis and provided with a magnet; an actuator including a coil part and a yoke part, the coil part being disposed within a magnetic field of the magnet, the yoke part being disposed to move the magnet horizontally, the actuator moving the lens assembly upward or downward along the optical axis when an electric power is applied to the coil part; and a friction-generating member supporting the lens assembly to generate a frictional force to the lens assembly in an opposite direction to a direction in which the lens assembly moves to the yoke part.

When the applying of the electric power to the coil part is stopped, the frictional force may stop the lens assembly.

The camera module may further include a housing, and the yoke part may constitute a surface of the housing and the surface may face the magnet, and the coil part may be attached to an inner surface of the yoke part, and the inner surface may be disposed toward an inside of the housing.

The lens assembly may include a friction-generating-member receiver part therein, and the friction-generating-member receiver part may receive the friction-generating member, and the friction-generating member may have a shaft shape and be in contact with a surface of the friction-generating-member receiver part to provide the frictional force using an axial pressure.

The yoke part disposed to move the magnet horizontally may constitute the friction-generating member, and the yoke part may be in contact with a surface of a friction-generating-member receiver part disposed in the lens assembly to provide the frictional force.

The yoke part may be bent in an opposite direction to a direction in which the magnet moves.

The camera module may further include a housing facing the magnet, and the yoke part may be provided to the housing, and the friction-generating member may be a rod extending from a side portion of the housing and be in contact with a surface of a friction-generating-member receiver part disposed in the lens assembly to provide the frictional force.

The friction-generating member may be bent in an opposite direction to a direction in which the magnet moves.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The spirit and scope of the present disclosure, however, shall not be construed as being limited to the embodiments provided herein. Rather, it will be apparent that other embodiments that fall within the spirit and scope of the present disclosure may easily be derived through adding, modifying, and deleting elements herein.

In addition, like reference numerals refer to like elements throughout.

Figure 1:
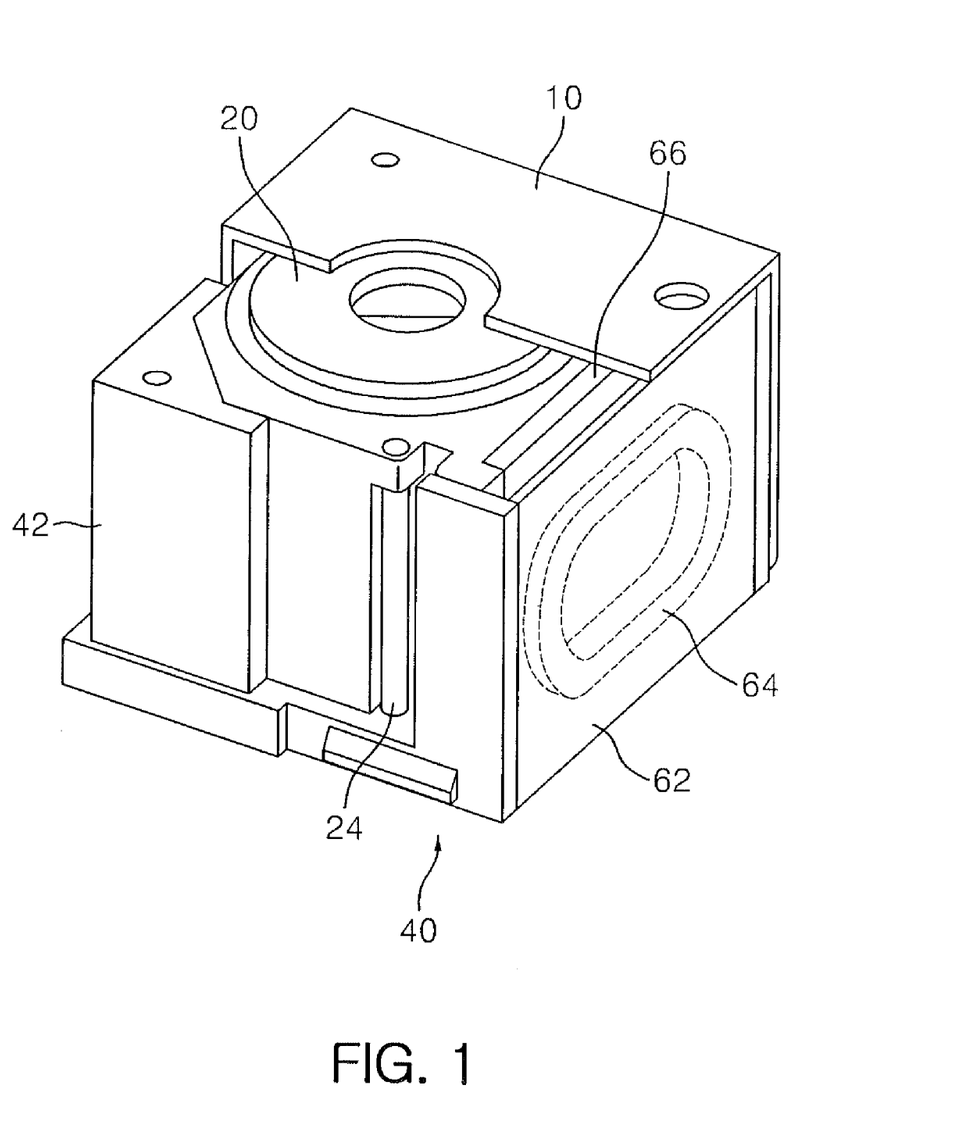
FIG. 1 is a cut-away perspective view illustrating a camera module according to an embodiment of the present invention.
Figure 2:
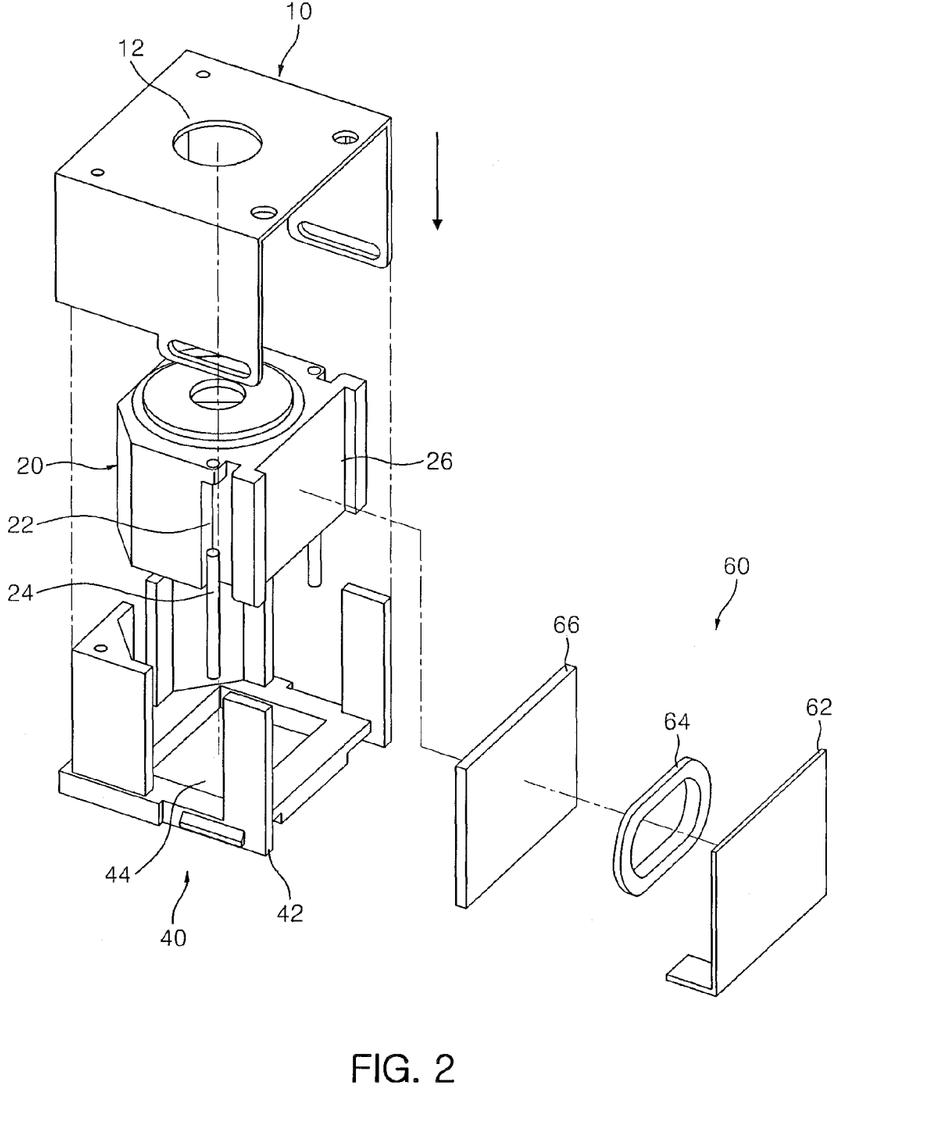
FIG. 2 is an exploded perspective view illustrating a camera module according to an embodiment of the present invention.

FIG. 1 is a cut-away perspective view illustrating a camera module 1 according to one embodiment of the present invention. FIG. 2 is an exploded perspective view illustrating the camera module 1 according to one embodiment of the present invention.

Referring to FIGS. 1 and 2, the camera module 1 may include a lens assembly 20, an actuator 60, and a friction-generating member 24.

The lens assembly 20, which functions as a holder receiving at least one lens, moves along an optical axis to bring an image into focus.

The actuator 60 drives the lens assembly 20 to move along the optical axis and includes a magnet 66 provided to one side of the lens assembly 20, a coil part 64 disposed within the magnetic field of the magnet 66 and receiving an electric power to control an up-and-down movement of the lens assembly 20, and a yoke part 62 for horizontally moving the magnet 66 provided to the lens assembly 20.

The magnet 66 is coupled to a magnet receiver part 26 provided to the lens assembly 20, and the attraction is exerted between the magnet 66 and the yoke part 62 to horizontally move the lens assembly 20 to the yoke part 62, aside from the movement along the optical axis.

The yoke part 62 may be formed of iron (Fe), cold rolled carbon steel (SPCC) or nickel (Ni) that have a high magnetic permeability.

The coil part 64 is disposed within the magnetic field of the magnet 66, that is, spaced a predetermined distance from the magnet 66. When the electric power is applied to the coil part 64, an electric current flows along the coil part 64, so that a Lorentz force occurs.

For example, the Lorentz force, generated at the coil part 64 when supplying a forward electric power to the coil part 64, moves the lens assembly 20 upward along the optical axis, and the Lorentz force, generated at the coil part 64 when supplying a reverse electric power to the coil part 64, moves the lens assembly 20 downward along the optical axis.

Since an electric power is supplied and an electric current flows along the coil part 64 disposed within the magnetic field generated by the magnet 66, so as to generate the Lorentz force, the actuator 60 just uses a lens-assembly-driving force of a related art voice coil actuator.

Since the attraction is continuously exerted between the magnet 66 and the yoke part 62, the lens assembly 20 moves horizontally to the yoke part 62 regardless of the optical axis.

At this point, the friction-generating member 24 generates a frictional force against the lens assembly 20 in the opposite direction to a direction in which the lens assembly 20 moves to the yoke part 62.

The frictional force generated between the friction-generating member 24 and the lens assembly 20 prevents the lens assembly 20 from returning to its initial position along the optical axis by gravity when the applying of the electric power to the coil part 64 is stopped.

Thus, the friction-generating member 24 is disposed in a structure of generating the frictional force against the lens assembly 20, and the frictional force stops the lens assembly 20 when the applying of the power to the coil part 64 is stopped.

That is, when the electric power is applied to the coil part 64 so as to generate the driving force, moving the lens assembly 20 upward or downward, at the coil part 64, the driving force is greater than the frictional force, so that the lens assembly 20 moves along the optical axis.

The camera module 1 may further include a housing 10 and a filter housing 40 aside from the lens assembly 20, the actuator 60, and the friction-generating member 24.

The housing 10 includes the lens assembly 20, the actuator 60, and the friction-generating member 24 therein, and the housing 10 may have open surfaces in a lower portion and a side portion. The lower portion of the housing 10 is closed by the filter housing 40 provided with an image sensor (not shown), and the yoke part 62 may close the open surface in the side portion of the housing 10.

The filter housing 40 may include a guide 42 and an opening 44. The guide 42 horizontally guides the lens assembly 20 placed thereon when the lens assembly 20 placed thereon moves upward or downward, and the image sensor is placed on the opening 44.

Figure 3:
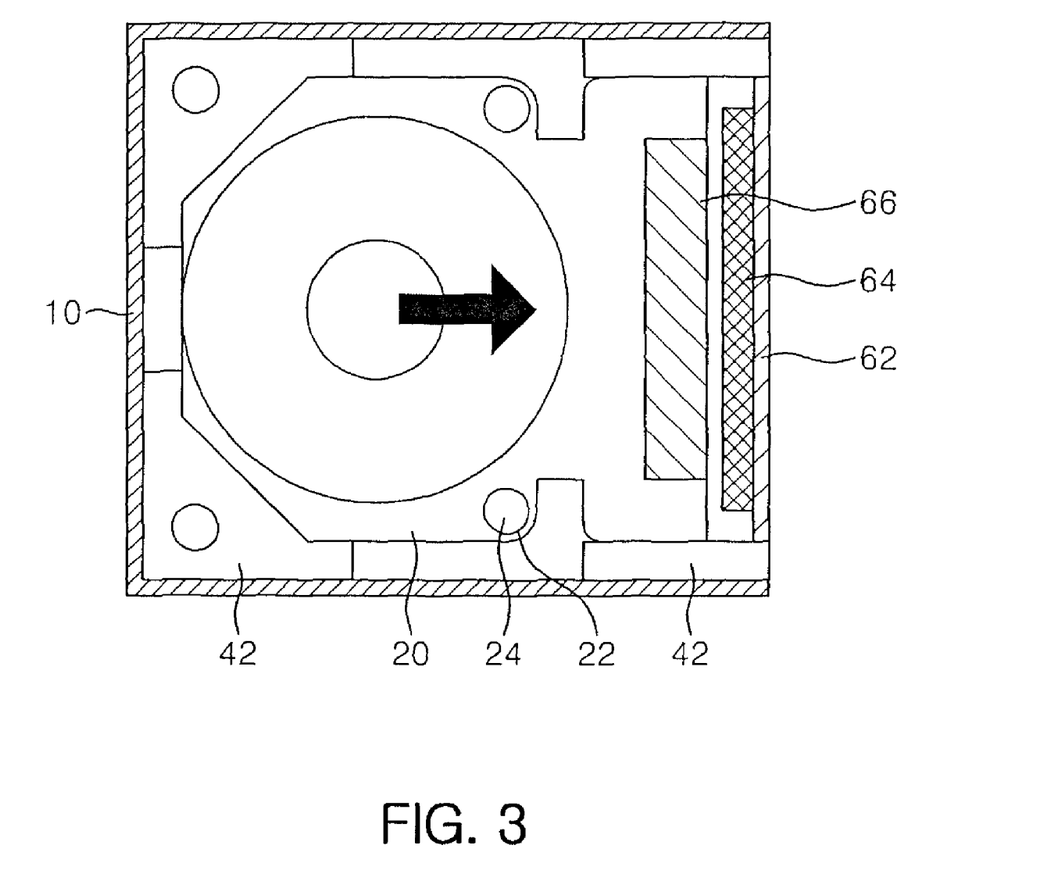
FIG. 3 is a plan view illustrating an actuator for a camera module according to an embodiment of the present invention.

FIG. 3 is a plan view illustrating the actuator 60 for a camera module according to one embodiment of the present invention.

Referring to FIG. 3, the actuator 60 may include the magnet 66, the coil part 64, and the yoke part 62.

The yoke part 62 may close one surface in the side portion of the housing 10 of the camera module 1. The yoke part 62 constitutes one surface of the housing 10, facing the magnet 66.

The coil part 64 is attached to an inner surface of the yoke part 62 toward the inside of the housing 10. If the coil part 64 is attached to an outer surface of the yoke part 62 toward the outside of the housing 10, the movement of the lens assembly 20 to the yoke part 62 is excessively greater than the movement of the lens assembly 20 along the optical axis, so as to increase the frictional force of the friction-generating member 24. Thus, the coil part 64 may be disposed on the inner surface of the yoke part 62.

The attraction is exerted (in an arrow direction of FIG. 3) between the yoke part 62 and the magnet 66 provided to the lens assembly 20, and the friction-generating member 24 generates the frictional force in the opposite direction to the direction in which the lens assembly 20 moves to the yoke part 62. A friction-generating-member receiver part 22 is disposed in the lens assembly 20, and receives the friction-generating member 24.

That is, the friction-generating member 24, having a shaft shape, is in contact with one surface of the friction-generating-member receiver part 22, so as to provide the frictional force using an axial pressure.

Figure 4:
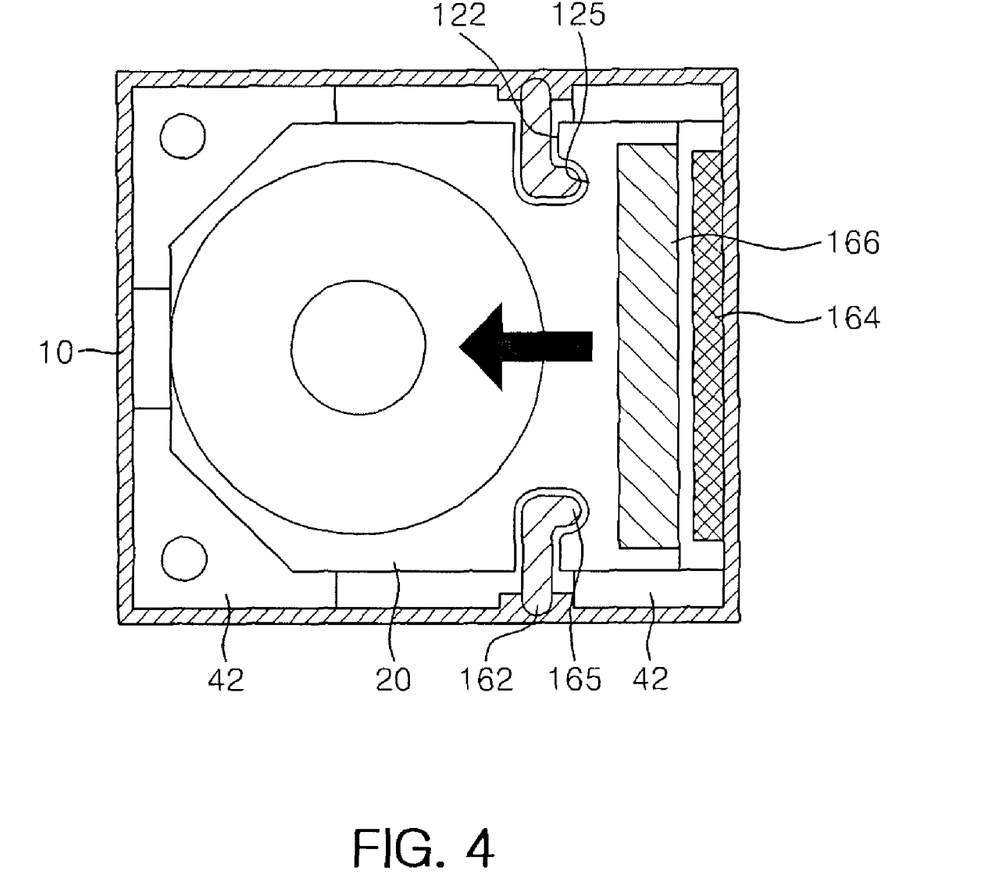
FIG. 4 is a plan view illustrating an actuator for a camera module according to another embodiment of the present invention.

FIG. 4 is a plan view illustrating the actuator 60 for a camera module according to another embodiment of the present invention.

Referring to FIG. 4, the actuator 60 may include a magnet 166, a coil part 164, and a yoke part 162.

The yoke part 162, provided to an inner side of the housing 10, may be a friction-generating member generating a frictional force in the opposite direction to a direction of the attraction moving the magnet 166 to the yoke part 162 (in an arrow direction of FIG. 4).

A friction-generating-member receiver part 122 receives the yoke part 162 that is in contact with one surface of the friction-generating-member receiver part 122 to provide the frictional force.

The yoke part 162 may be provided with a front end 165 bent in the opposite direction to the moving direction of the magnet 166. A front end contact part 125 of the friction-generating-member receiver part 122 has the same shape as the front end 165, so that the front end contact part 125 can be in contact with the front end 165.

Since other structures constituting the actuator 60 according to this embodiment are the same as those in the embodiment of FIG. 3, descriptions thereof will be omitted.

Figure 5:
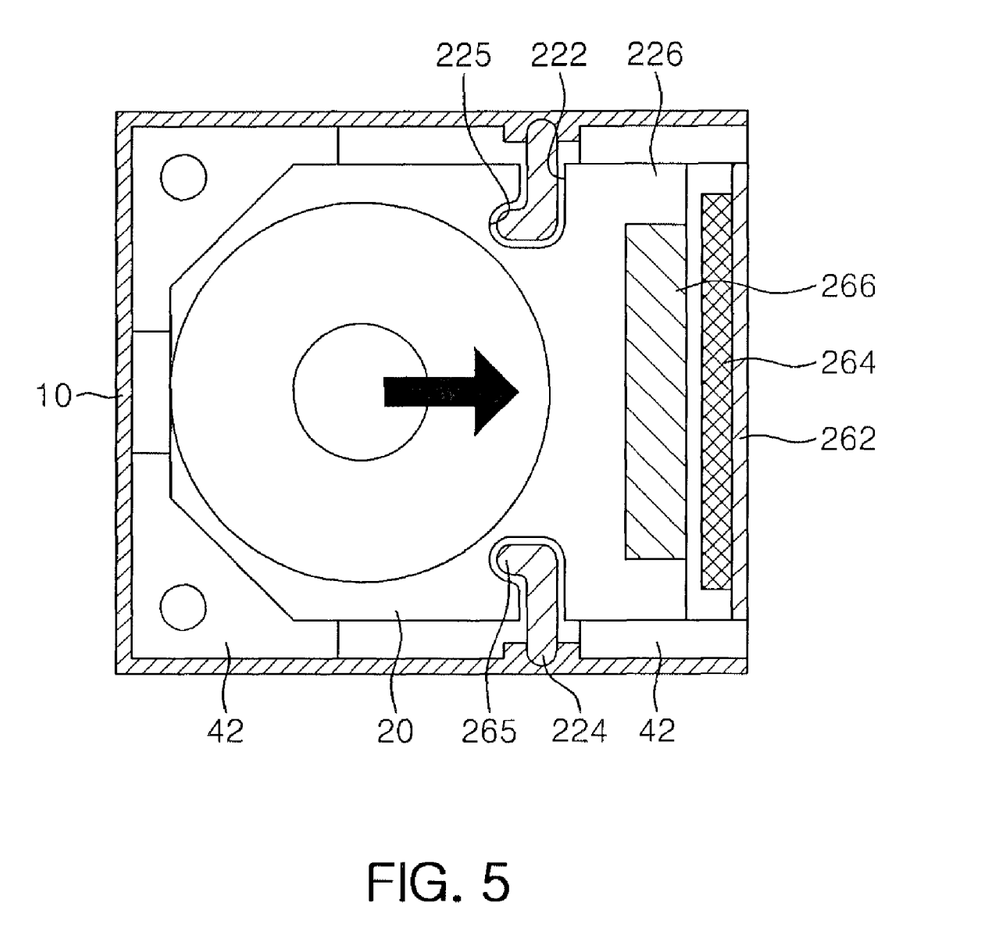
FIG. 5 is a plan view illustrating an actuator for a camera module according to another embodiment of the present invention.

FIG. 5 is a plan view illustrating the actuator 60 for a camera module according to another embodiment of the present invention.

Referring to FIG. 5, the actuator 60 may include a magnet 266, a coil part 264, and a yoke part 262.

The yoke part 262 may close one surface in the side portion of the housing 10 of the camera module 1. The yoke part 262 constitutes one surface of the housing 10, facing the magnet 266.

The coil part 264 is attached to an inner surface of the yoke part 262. The inner surface is toward the inside of the housing 10. If the coil part 264 is attached to an outer surface of the yoke part 262, which is toward the outside of the housing 10, the movement of the lens assembly 20 to the yoke part 62 is excessively greater than the movement of the lens assembly 20 along the optical axis, so as to increase the frictional force exerted on the friction-generating member 224. Thus, the coil part 264 may be disposed at the inner surface of the yoke part 262.

The friction-generating member 224 is a rod extending from the side portion of the housing 10 of the camera module 1, and in contact with a surface of a friction-generating-member receiver part 222 disposed in the lens assembly 20 so as to provide the frictional force.

The friction-generating member 224 may be provided with a front end 265 bent in the opposite direction to the moving direction (an arrow direction of FIG. 5) of the magnet 266. A front end contact part 225 of the friction-generating-member receiver part 222 has the same shape as the front end 265, so that the front end contact part 225 can be in contact with the front end 265.

Since other structures constituting the actuator 60 according to this embodiment are the same as those in the embodiment of FIG. 3, descriptions thereof will be omitted.

Hereinafter, a method of controlling an actuator for a camera module will now be described according to one embodiment of the present invention.

Figure 6:
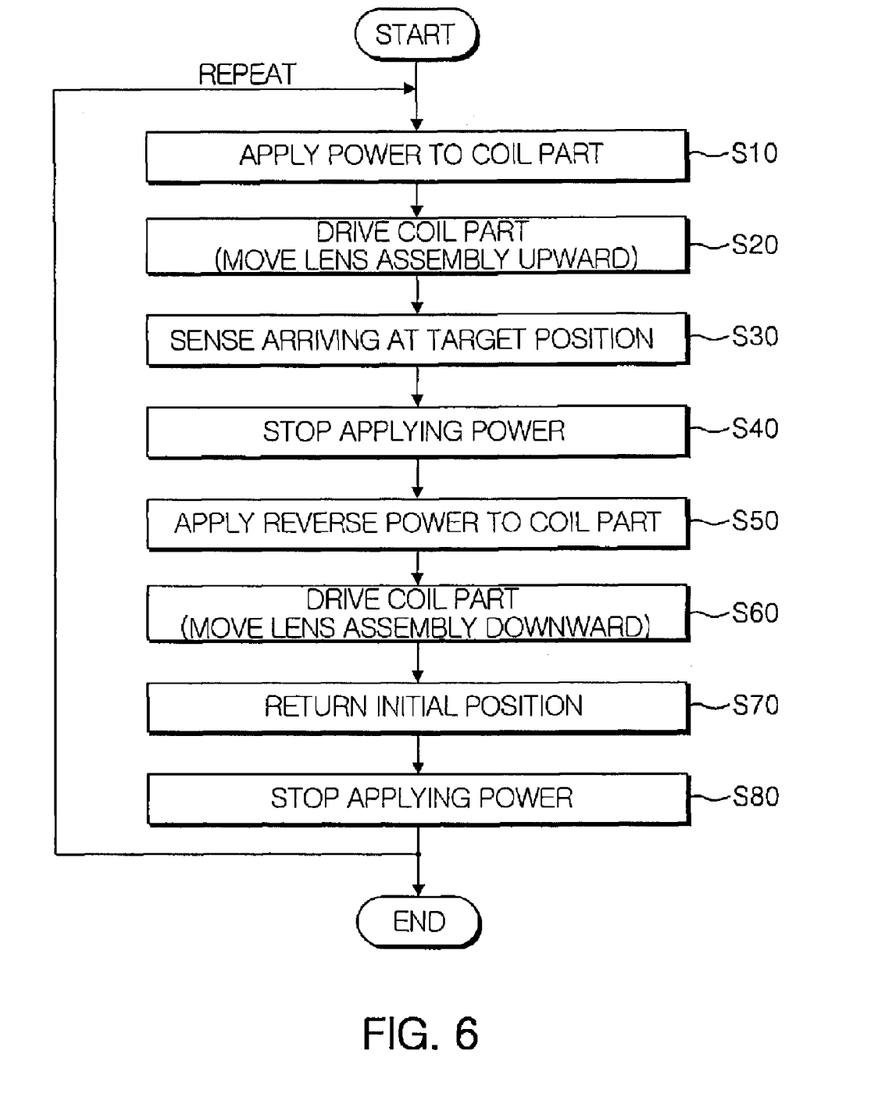
FIG. 6 is a flowchart illustrating a method of controlling an actuator for a camera module according to an embodiment of the present invention.
Figure 7:
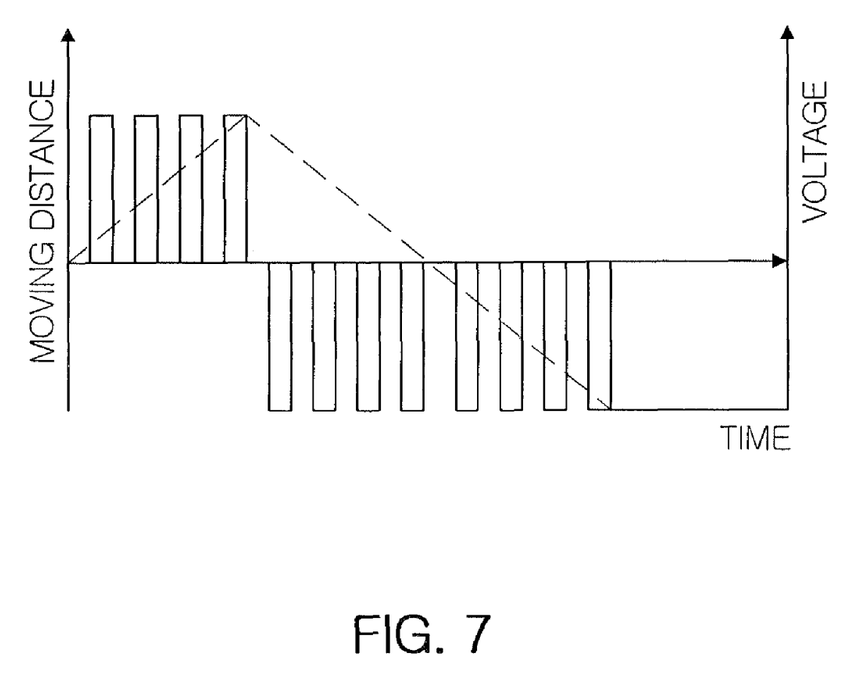
FIG. 7 is a graph illustrating a driving efficiency according to a method of controlling an actuator for a camera module according to an embodiment of the present invention.

FIG. 6 is a flowchart illustrating the method of controlling an actuator for a camera module according to the embodiment of the present invention. FIG. 7 is a graph illustrating a driving efficiency according to the method of controlling an actuator for a camera module according to one embodiment of the present invention.

Referring to FIGS. 6 and 7, when the forward electric power is applied to the coil part 64 disposed within the magnetic field of the magnet 66 in operation S10, the lens assembly 20, one side of which is provided with the magnet 66, is moved along the optical axis by the Lorentz force in operation S20.

In operation S30, when the lens assembly 20 arrives at a target position, a position sensor (not shown), sensing the position of the lens assembly 20, senses that the lens assembly 20 arrives at the target position. In operation S40, the position sensor stops the applying of the electric power. In here, the position sensor may be a hall sensor. The frictional force of the friction-generating member 24 supported against the lens assembly 20, due to the force moving the magnet 66 horizontally to the yoke part 62, prevents the lens assembly 20 from moving.

The frictional force is exerted in the opposite direction to the direction in which the lens assembly 20 moves to the yoke part 62, and the driving force, vertically moving the lens assembly 20 and generated at the coil part 64 when the power is applied, is greater than the frictional force. Thus, the lens assembly 20 moves along the optical axis.

When the reverse electric power is applied to the coil part 64 in operation S50, the lens assembly 20 moves downward along the optical axis in operation S60, and returns to the initial position in operation S70.

In operation S80, the position sensor senses the returning to the initial position and stops the applying of the reverse electric power.

These operations can be repeated. First, in the state where the lens assembly 20 is at the initial position, when the reverse electric power is applied to the coil part 64, the lens assembly 20 moves downward along the optical axis. After that, when the forward electric power is applied to the coil part 64, the lens assembly 20 moves upward along the optical axis.

Referring to FIG. 7, when the forward electric power is applied, the lens assembly 20 moves from the initial position and stops, and when the reverse power is applied, the lens assembly 20 moves downward, passing by the initial position, and stops, thereby providing the driving efficiency according to a pulse-inputting method.

That is, in the case of a related art camera module including a voice coil actuator, when a lens assembly arrives at a target position, an electric current is continuously supplied to keep the lens assembly at the target position. However, in the case of the camera module according to the present invention, the frictional force is generated in the opposite direction to the direction in which the magnet moves to the yoke part, so as to keep the lens assembly at the target position without continuously supplying the electric current.

The actuator for a camera module, the method of controlling the actuator and the camera module including the actuator according to the present invention are adapted such that the lens assembly returns to its initial position without using a spring, so as to prevent malfunctions including tilting and decentering due to instability of the spring.

Also, since a spring, tending to automatically returns to its initial position, is not required, the lens assembly is kept at the position at which the lens assembly arrives without continuously applying an electric current, thereby reducing the consumed power.

Also, when the applying of the forward electric power to the lens assembly moving upward along the optical axis is stopped, the frictional force stops the lens assembly, and when the reverse electric power is applied to the lens assembly, the lens assembly is moved downward along the optical axis, which is controlled by applying pulse voltage, thereby remarkably reducing the consumed power.

Also, since the actuator according to the present invention has fewer components than a piezo actuator or a voice coil actuator does, material costs and the number of processes are reduced and productivity is improved.

Also, to stop the lens assembly with the frictional force when stopping the applying of the electric current, the magnet disposed toward the yoke part is provided to only one side of a lens barrel, thereby reducing the entire size of the camera module.

While the present invention has been shown and described in connection with the exemplary embodiments, it will be apparent to those skilled in the art that modifications and variations can be made without departing from the spirit and scope of the invention as defined by the appended claims.

What is claimed is:

1. An actuator used for a camera module and controlling a lens assembly to move along an optical axis, the actuator comprising:
    a magnet disposed on a side of the lens assembly;
    a coil part disposed within a magnetic field of the magnet and controlling an up-and-down movement of the lens assembly when an electric power is applied; and
    a yoke part disposed to horizontally move the magnet disposed on the side of the lens assembly, wherein
    the lens assembly is provided with a friction-generating member generating a frictional force to the lens assembly in an opposite direction to a direction in which the lens assembly moves to the yoke part,
    the lens assembly comprises a friction-generating member receiver part therein, and the friction-generating-member receiver part receives the friction-generating member, and
    the friction-generating member has a shaft shape and is in contact with a surface of the friction-generating-member receiver part to provide the frictional force.

2. The actuator of claim 1, wherein the frictional force stops the lens assembly when the applying of the electric power to the coil part is stopped.

3. The actuator of claim 1, wherein the yoke part constitutes a surface of a housing of the camera module and the surface faces the magnet, and
    the coil part is attached to an inner surface of the yoke part, and the inner surface is disposed toward an inside of the housing.

4. The actuator of claim 1, wherein the yoke part disposed to move the magnet horizontally constitutes the friction-generating member, and
    the yoke part is in contact with a surface of a friction-generating-member receiver part disposed in the lens assembly to provide the frictional force.

5. The actuator of claim 4, wherein the yoke part is bent in an opposite direction to a direction in which the magnet moves.

6. An actuator used for a camera module and controlling a lens assembly to move along an optical axis, the actuator comprising;
 a magnet disposed on a side of the lens assembly;
 a coil part disposed within a magnetic field of the magnet and controlling an up-and-down movement of the lens assembly when an electric power is applied; and
 a yoke part disposed to horizontally move the magnet disposed on the side of the lens assembly, wherein
 the lens assembly is provided with a friction-generating member generating a frictional force to the lens assembly in an opposite direction to a direction in which the lens assembly moves to the yoke part,
 the yoke part is provided to a housing of the camera module, and the housing faces the magnet, and
 the friction-generating member is a rod extending from a side portion of the housing of the camera module and is in contact with a surface of a friction-generating-member receiver part disposed in the lens assembly to provide the frictional force.

7. The actuator of claim 6, wherein the friction-generating member is bent in an opposite direction to a direction in which the magnet moves.

8. A method of controlling an actuator for a camera module, the method comprising:
 applying a forward electric power to a coil part disposed within a magnetic field of a magnet provided to a side of a lens assembly, to move the lens assembly upward along an optical axis;
 stopping the applying of the forward electric power to the coil part when the lens assembly arrives at a target position;
 stopping the lens assembly using a frictional force of a friction-generating member supported against the lens assembly, the frictional force being generated by a force horizontally moving the magnet to a yoke part; and
 applying a reverse electric power to the coil part to move the lens assembly downward along the optical axis, wherein
 the lens assembly comprises a friction-generating-member receiver part therein, and the friction-generating member receiver part receives the friction-generating member, and
 the friction-generating member has a shaft shape and is in contact with a surface of the friction-generating-member receiver part to provide the frictional force.

9. The method of claim 8, wherein the frictional force is generated in an opposite direction to a direction in which the lens assembly moves to the yoke part.

10. The method of claim 8, wherein when the lens assembly arrives at the target position, a hall sensor senses the target position of the lens assembly to transmit a signal stopping the applying of the electric power.

11. A camera module comprising:
 a lens assembly movable upward and downward along an optical axis and provided with a magnet;
 an actuator including a coil part and a yoke part, the coil part being disposed within a magnetic field of the magnet, the yoke part being disposed to move the magnet horizontally, the actuator moving the lens assembly upward or downward along the optical axis when an electric power is applied to the coil part; and
 a friction-generating member supporting the lens assembly to generate a frictional force to the lens assembly in an opposite direction to a direction in which the lens assembly moves to the yoke part, wherein
 the lens assembly comprises a friction-generating-member receiver part therein, and the friction-generating member receiver part receives the friction-generating member, and
 the friction-generating member has a shaft shape and is in contact with a surface of the friction-generating-member receiver part to provide the frictional force.

12. The camera module of claim 11, wherein when the applying of the electric power to the coil part is stopped, the frictional force stops the lens assembly.

13. The camera module of claim 11, further comprising a housing, wherein
 the yoke part constitutes a surface of the housing and the surface faces the magnet, and
 the coil part is attached to an inner surface of the yoke part, and the inner surface is disposed toward an inside of the housing.

14. The camera module of claim 11, wherein
 the yoke part disposed to move the magnet horizontally constitutes the friction-generating member, and
 the yoke part is in contact with a surface of a friction-generating-member receiver part disposed in the lens assembly to provide the frictional force.

15. The camera module of claim 14, wherein the yoke part is bent in an opposite direction to a direction in which the magnet moves.

16. A camera module comprising:
 a lens assembly movable upward and downward along an optical axis and provided with a magnet;
 an actuator including a coil part and a yoke part, the coil part disposed within a magnetic field of the magnet, the yoke part being disposed to move the magnet horizontally, the actuator moving the lens assembly upward or downward along the optical axis when an electric power is applied to the coil part;
 a friction generating member supporting the lens assembly to generate a frictional force to the lens assembly in an opposite direction to a direction in which the lens assembly moves to the yoke part; and
 a housing facing the magnet, wherein
 the yoke part is provided to the housing, and
 the friction-generating member is a rod extending from a side portion of the housing and is in contact with a surface of a friction-generating-member receiver part disposed in the lens assembly to provide the frictional force.

17. The camera module of claim 16, wherein the friction-generating member is bent in an opposite direction to a direction in which the magnet moves.

* * * * *

UNITED STATES PATENT AND TRADEMARK OFFICE
CERTIFICATE OF CORRECTION

| | | |
|---|---|---|
| PATENT NO. | : 7,869,150 B2 | Page 1 of 1 |
| APPLICATION NO. | : 12/485531 | |
| DATED | : January 11, 2011 | |
| INVENTOR(S) | : Young Bok Yoon et al. | |

It is certified that error appears in the above-identified patent and that said Letters Patent is hereby corrected as shown below:

Title Page, Column 1 Item (73) (Assignee), Line 1, delete "Electro-Mechancis" and insert --Electro-Mechanics--, therefor.

Column 10, Line 41, In Claim 16, delete "part" and insert --part being--, therefor.

Signed and Sealed this
Fourteenth Day of June, 2011

David J. Kappos
*Director of the United States Patent and Trademark Office*